United States Patent
Hansen et al.

(10) Patent No.: US 7,077,754 B2
(45) Date of Patent: Jul. 18, 2006

(54) TELESCOPIC GUARD FOR COUPLED SHAFTS

(75) Inventors: George N. P. Hansen, Rubicon, WI (US); Mark A. Fechter, West Bend, WI (US)

(73) Assignee: Weasler Engineering, Inc., West Bend, WI (US)

( * ) Notice: Subject to any disclaimer, the term of this patent is extended or adjusted under 35 U.S.C. 154(b) by 0 days.

(21) Appl. No.: 10/767,703

(22) Filed: Jan. 29, 2004

(65) Prior Publication Data

US 2005/0170900 A1    Aug. 4, 2005

(51) Int. Cl.
F16D 3/84    (2006.01)

(52) U.S. Cl. .................... 464/172; 56/DIG. 24; 74/609

(58) Field of Classification Search ............... 464/169, 464/170, 172; 74/609; 56/DIG. 24; 285/302; 180/84
See application file for complete search history.

(56) References Cited

U.S. PATENT DOCUMENTS

| | | | |
|---|---|---|---|
| 920,326 A | 5/1909 | Hill | |
| 2,242,604 A * | 5/1941 | Wells | 285/302 X |
| 2,459,918 A * | 1/1949 | Chester | 285/302 X |
| 2,845,283 A * | 7/1958 | Kuhn | 285/302 X |
| 2,923,140 A | 2/1960 | Weasler | |
| 3,031,865 A | 5/1962 | Weasler | |
| 3,113,441 A | 12/1963 | Weasler | |
| 3,618,340 A * | 11/1971 | Geisthoff et al. | 464/172 X |
| 4,605,332 A | 8/1986 | Mayhew et al. | |
| 5,702,306 A | 12/1997 | Adamek et al. | |

FOREIGN PATENT DOCUMENTS

| | | | |
|---|---|---|---|
| DE | 211984 * | 4/1908 | 464/172 |
| EP | 0 086 606 A1 | 8/1983 | |
| EP | 0 771 961 A1 | 5/1997 | |
| WO | WO 94/19923 | 9/1994 | |

* cited by examiner

Primary Examiner—Greg Binda
(74) Attorney, Agent, or Firm—Quarles & Brady LLP

(57) ABSTRACT

A guard for covering the union of two rotating drive shafts that are movable in a telescoping manner through a travel distance along a shaft axis includes inner, center and outer guard sleeves disposed about the shafts along the shaft axis. The sleeves are preferably cylindrical and concentric with the shaft axis. The center guard sleeve is radially disposed between the inner and outer guard sleeves in axially overlapping relation. A spring applies an axial force acting on the inner and center guard sleeves to maintain the overlap between the center guard sleeve and both of the inner and outer guard sleeves throughout the travel distance of the shafts. The center and inner guard sleeves are linked by a radial tab slideably retained in a slot in the inner guard sleeve.

15 Claims, 2 Drawing Sheets

TELESCOPIC GUARD FOR COUPLED SHAFTS

CROSS-REFERENCE TO RELATED APPLICATION

Not applicable.

STATEMENT OF FEDERALLY SPONSORED RESEARCH OR DEVELOPMENT

Not applicable.

BACKGROUND OF THE INVENTION

1. Technical Field

The present invention relates to telescopically expandable guards for covering coupled rotating shafts.

2. Description of the Related Art

Power drive lines, such as the power take-off shaft of a mobile prime mover, a tractor for example, and the power input shaft of an attached implement, a mower deck for example, can have rotating shafts and other components that would be exposed to the surrounding environment unless shielded in some way. Exposed rotating components are a hazard and are susceptible to damage if interfered with. Fixed covers and guards are typically used to partially or fully encase these components.

Often, however, the mating components pivot or translate relative to each other during operation, such as is the case of a power field implement, coupled to the power take-off shaft of a tractor. The mating components are thus often coupled with telescoping shafts and one or more universal joints may be used to provide an articulated coupling accommodating this movement and any angular misalignment that may exist.

Guards for telescopically coupled shafts and universal joints are well known, see e.g. U.S. Pat. Nos. 3,031,865; 3,113,441 and 4,605,332. Prior art guards are usually provided in two halves. One half of the guard can be axially fixed or journaled upon a rotating member of the drive line and the other half can be stationary, being fixed to either the prime mover or to the implement. Or, both of the guard sections can be freely rotatable upon their respective shaft sections. In either case, the guard covers the rotating shafts and has smooth external surfaces that do not readily grab fingers, clothing, etc. If the guard rotates, there is usually such low friction between the guard and the shafts that the guard will come to rest if contacted without impeding the rotation of the shafts.

Typically one or both of the two guard sections are shorter than the length of the associated shaft so that at least one of the mating ends of the shafts are visible for coupling and also so that the shafts can be coupled fully without interference from the guard. Despite being shorter than the shafts, when the shafts are coupled fully the guard sections overlap and cover both shafts. However, in extreme situations in which the shafts are pulled apart so as to be near disengagement, the guard sections can separate and expose the rotating shafts, thereby rendering the guard at least partially ineffective.

An improved telescopic guard for shielding coupled rotating shafts is therefore needed.

SUMMARY OF THE INVENTION

The present invention provides a guard for shielding the rotating shafts, particularly as a part of a power-take off drive line, in which the shafts tend to move back and forth along the shaft axis during operation. The guard surrounds the coupled shafts and is telescopically moveable to accommodate the axial movement of the shafts. The guard utilizes three separate sleeves that maintain an overlapping relation as the shafts move.

Specifically, the invention is a guard for covering the union of mating first and second shafts that are rotatable about and relatively telescopic along a shaft axis. The guard includes an inner guard sleeve extending along the shaft axis about the first shaft, an outer guard sleeve extending along the shaft axis about the second shaft radially outside of the inner guard sleeve, and a center guard sleeve extending along the shaft axis radially between the inner and outer guard sleeve. The center guard sleeve is overlapped by the outer guard sleeve and overlaps the inner guard sleeve. The center guard sleeve is biased axially toward either the inner and outer guard sleeves so as to move axially in response to telescopic movement of the first and second shafts and bridge any gap between the ends of the inner and outer guard sleeves.

The invention also provides a guard for covering the union of two rotating shafts movable in telescoping relation through a travel distance along a shaft axis. The inner, center and outer guard sleeves axially overlap each other and are biased by a spring to maintain the overlap throughout the travel distance of the shafts.

In one preferred form, the guard sleeves are cylindrical and concentric with the shaft axis. It should be noted, however, that the present invention can include sleeves of various non-cylindrical configurations, such as various flat-sided shapes.

In another preferred form, the guard includes a spring acting against the center guard sleeve and the inner guard sleeve to bias the center guard sleeve axially toward the outer guard sleeve. The inner and center guard sleeves each have a radial end piece against which the spring acts.

In another preferred form, the center guard sleeve is slideably linked to one of the inner and outer guard sleeves, preferably in a tab and slot retention arrangement in which a bent-in tab of the center guard sleeve fits into a slot in the inner guard sleeve. The tab can have a widened section preventing the tab from inadvertently pulling through the slot in the inner guard sleeve.

The advantages of the invention will be apparent from the detailed description and drawings. What follows is a preferred embodiment of the present invention. To assess the full scope of the invention the claims should be referenced as the preferred embodiment is not intended as the only embodiment within the scope of the invention.

DETAILED DESCRIPTION OF THE PREFERRED EMBODIMENT

Figure 1:
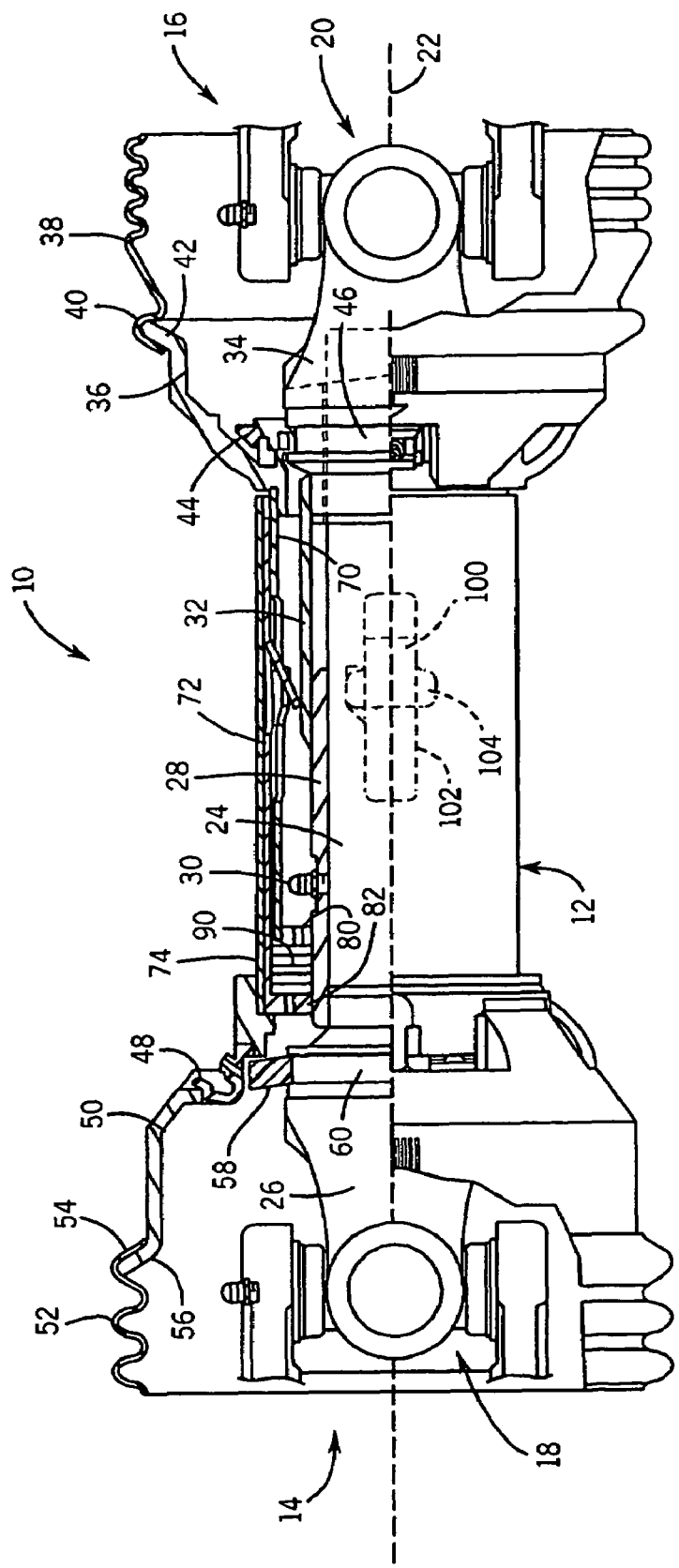
FIG. 1 is front view in partial cross-section showing the telescopic guard of the present invention on a drive line connecting a power take-off shaft to a power input shaft of an implement.
Figure 2:
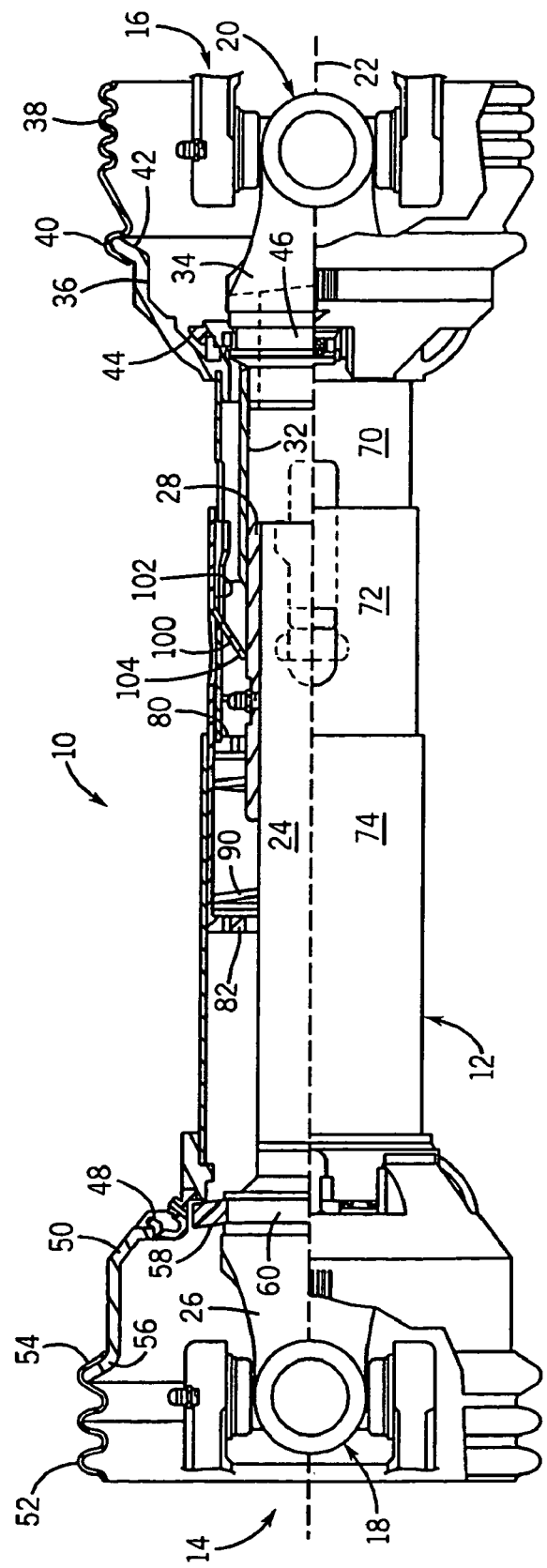
FIG. 2 view similar to FIG. 1 albeit showing the drive line, and guard, extended telescopically.

FIGS. 1 and 2 illustrate a telescoping drive line 10 for connecting a prime mover to an attachment, such as a tractor to a mobile implement. The drive line 10 includes a guard 12 made in accordance with the invention. End 14 could be connected to the power output shaft of the tractor and the other end 16 could be connected to the power input shaft of the implement. Ends 14 and 16 include universal joints 18 and 20. The universal joints 18 and 20 are of standard construction, and since the guard of the present invention could be applied to different drive line configurations, the universal joints and their operation will not be described in detail herein. An externally splined shaft 24 is fixed to a yoke 26 of universal joint 18 and is received within an internally splined hub shaft 28 to provide a telescoping connection between the shaft and the hub shaft. The hub has a grease fitting 30 and is fixed to a tube 32 which is fixed to a yoke 34 of universal joint 20.

The guard of the present invention covers both of the universal joints 18 and 20 as well as the coupled shaft and hub shaft. Universal joint 20 is covered by a bell housing 36 and boot 38 assembly. One end of the boot 38 forms an annular clip 40 receiving a circumferential lip 42 of the bell housing 36. The opposite end of the boot 38 is corrugated for added strength. The bell housing 36 is journaled to the yoke 34 by a bushing 44 which fits in a groove 46 in the yoke 34 and is retained by a keeper 48, which fits into an opening in the bell housings 36 and 50 to retain the bushings 44 and 58. Universal joint 18 includes a bell housing 50 and boot 52 assembly of slightly different configuration. The boot 52 has corrugations and a clip 54 capturing a lip 56 of the bell housing 50. The bell housing 50 is journaled to the yoke 26 by another bushing 58 disposed in groove 60. The bushing 58 attaches to the bell housing 50 via a keeper 48.

The bell housings 36 and 50 are preferably molded plastic, such as polyethylene, and the boots 38 and 52 are preferably molded from a relatively flexible plastic having good cold weather impact properties, such as low or high density polyethylene. The outer ends of both boots 38 and 52 extend beyond the ends of the universal joints 18 and 20 so as to cover the couplings or shafts leading to the prime mover and implement. For example, the ends of the boots 38 and 52 could extend into a stationary guard provided on the tractor and implement so that the entire drive line is shielded against contact by users. Also, lubrication access openings can be provided in the boots or bell housings as needed.

The bushings 44 and 58 are made of a wear resistant plastic material such as nylon. Note that although the bushings 44 and 58 are capable of rotation relative to the yokes 18 and 20, respectively, they normally rotate with the yokes. Therefore, the bell housings and boots rotate relative to the yokes only when necessary, such as when contacted by someone or something. Note that the boots are preferably shrink fit to the associated bell housings.

The bell housings mount a telescoping sleeve assembly therebetween including an inner guard sleeve 70, a center guard sleeve 72 and an outer guard sleeve 74. The inner guard sleeve 70 is fixed to the bell housing 36 at one end and its other end is overlapped by the center guard sleeve 72, which in turn is overlapped by the outer guard sleeve 74 having its end fixed to the other bell housing 50. The guard sleeves are preferably concentric with the shaft axis. Preferably, the guard sleeves are made of plastic and the inner 70 and outer 74 guard sleeves are ultrasonically or friction welded to the associated bell housing. Like the bell housings and boots, the telescoping sleeve assembly, by virtue of its connection to the bell housings and the presence of the bushings 44 and 58, can be stationary or rotate relative to the drive line 10 if obstructed, however, normally it would rotate with the drive line 10.

End pieces 80 and 82, of suitable shape such as annular, are fixed to respective ends of the inner 70 and center 72 guard sleeves, respectively. The end pieces 80 and 82 are shown as separate components, but could be a unitary part of the associated sleeves, perhaps by bending in one or more cut sections thereof. These end pieces 80 and 82 provide a surface for a spring 90 to act against, and thereby bias the center guard sleeve 72 in the axial direction toward the outer guard sleeve 74. The spring 90 is disposed axially between the end pieces and acts against the inner guard sleeve 70 to apply a force on the center guard sleeve 72 that tends to maintain an overlapping relationship between the center guard sleeve 72 and the other guard sleeve during the range of travel along the axis 22 realized during operation so as to bridge any gap between the ends of the inner 70 and outer 74 guard sleeves. As shown in FIG. 1, the three guard sleeves are nearly fully overlapped when the shaft is fully seated within the shaft hub. In this position, the spring 90 is fully compressed so that the maximum spring force can be exerted to drive the center guard sleeve 72 in the axial direction of the outer guard sleeve 74 as the inner 70 and outer 74 guard sleeves move apart, such as shown in FIG. 2, in response to separation of the shaft and shaft hub during operation of the drive line 10. Preferably, the spring 90 is sized and selected to provide an axial force suitable for maintaining a generally even length of overlap between the center guard sleeve 72 and each of the other guard sleeves.

The guard sleeves of the telescoping sleeve assembly are preferably designed to be rotationally linked together, such as by slideably linking the center guard sleeve 72 to one of the inner 70 or outer 74 guard sleeves. Preferably, a tab 100 is pierced from (and thus integral to) the center guard sleeve 72 and bent radially inward to fit into an axial slot 102 in the inner guard sleeve 70. The tab 100 has a widened head 104 that is wider than the small width dimension of the slot 102 such that the head 104 can pass through the slot 102 only when sidewise. This avoids inadvertent disconnection of the tab 100 from the slot 102, yet permits the inner guard sleeve 70 to be unlinked from the center guard sleeve 72 by manual manipulation of the tab 100. The center guard sleeve 72 is not linked to the outer guard sleeve 74 so that the two halves of the driveline may be taken apart more readily, although a similar tab and slot retention system could be used if it is desired. Note also that there could be multiple tab and slot connections spaced apart circumferentially along the mating sleeves.

It should be appreciated that merely a preferred embodiment of the invention has been described above. However, many modifications and variations to the preferred embodiment will be apparent to those skilled in the art, which will be within the spirit and scope of the invention. Therefore, the invention should not be limited to the described embodiment. To ascertain the full scope of the invention, the following claims should be referenced.

What is claimed is:

1. A guard for covering the union of mating first and second shafts that extend from respective first and second bell housings and that are rotatable about and relatively telescopic along a shaft axis, the guard comprising:

an inner guard sleeve extending along the shaft axis and linked to the first bell housing;

an outer guard sleeve extending along the shaft axis radially outside of the inner guard sleeve and linked to the second bell housing; and a center guard sleeve extending along the shaft axis radially between the inner and outer guard sleeves, the center guard sleeve being overlapped by the outer guard sleeve and overlapping the inner guard sleeve along the shaft axis and being biased axially toward one of the inner and outer guard sleeves so as to move axially in response to telescopic movement and bridge any gap between the ends of the inner and outer guard sleeves;

wherein the center guard sleeve is slideably linked to one of the inner and outer guard sleeves;

wherein the center guard is linked in a tab and slot retention arrangement.

2. The guard of claim 1, further comprising a spring acting against the center guard sleeve and one of the inner and outer guard sleeves.

3. The guard of claim 2, wherein the spring biases the center guard sleeve axially toward the outer guard sleeve.

4. The guard of claim 3, wherein the inner guard sleeve includes a radial end piece and the center guard sleeve includes a radial end piece, and wherein the spring is axially disposed between the end pieces.

5. The guard of claim 1, wherein the center guard sleeve is linked to the inner guard sleeve and biased toward the outer guard sleeve.

6. The guard of claim 1, wherein at least one guard sleeve is co-axial with the shaft axis.

7. A guard for covering the union of mating first and second shafts that are rotatable about and relatively telescopic along a shaft axis, the guard comprising:

an inner guard sleeve extending along the shaft axis;

an outer guard sleeve extending along the shaft axis radially outside of the inner guard sleeve; and a center guard sleeve extending along the shaft axis radially between the inner and outer guard sleeves, the center guard sleeve being overlapped by the outer guard sleeve and overlapping the inner guard sleeve along the shaft axis and being biased axially toward one of the inner and outer guard sleeves so as to move axially in response to telescopic movement of the first and second shafts so as to bridge any gap between the ends of the inner and outer guard sleeves, wherein the center guard sleeve is slideably linked to the inner guard sleeve by a tab and slot retention arrangement, which includes a tab extending radially inward and received by an axially extending slot.

8. The guard of claim 7, wherein the tab has a section of a width greater than a width of the slot.

9. The guard of claim 7, wherein the tab is integral with the center guard sleeve.

10. A guard for covering the union of two rotating shafts movable in telescoping relation through a travel distance along a shaft axis, the guard comprising:

two bell housings for covering portions of the shafts; and inner, center and outer guard sleeves disposed along the shaft axis between the bell housings, the center guard sleeve being radially between the inner and outer guard sleeves in axially overlapping relation and being spring-biased to maintain the overlap between the center guard sleeve and both of the inner and outer guard sleeves throughout the travel distance of the shafts;

wherein the center guard sleeve is slideably linked to the inner guard sleeve;

wherein the center guard is biased toward the outer guard sleeve and linked in a tab and slot retention arrangement to the inner guard sleeve.

11. The guard of claim 10, further including a spring and wherein the spring biases the center guard sleeve axially toward the outer guard sleeve.

12. The guard of claim 11, wherein the inner guard sleeve includes a radial end piece and the center guard sleeve includes a radial end piece, and wherein the spring is axially disposed between the end pieces.

13. The guard of claim 10, wherein the guard sleeves are concentric with the shaft axis.

14. A guard for covering the union of two rotating shafts movable in telescoping relation through a travel distance along a shaft axis, the guard comprising: inner, center and outer guard sleeves disposed along the shaft axis, the center guard sleeve being radially between the inner and outer guard sleeves in axially overlapping relation and being biased by a spring to maintain the overlap between the center guard sleeve and both of the inner and outer guard sleeves throughout the travel distance of the shafts, wherein the center guard sleeve is slideably linked to the inner guard sleeve in a tab and slot retention arrangement, which includes an integral tab extending radially inward and received by an axially extending slot.

15. The guard of claim 14, wherein the tab has a section of a width greater than a width of the slot.

* * * * *